US011280770B2

(12) United States Patent
Maisch

(10) Patent No.: US 11,280,770 B2
(45) Date of Patent: Mar. 22, 2022

(54) LC-COLUMN WITH DYNAMIC-AXIAL COMPRESSION (DAC)

(71) Applicant: Dr. Albin Maisch High Performance LC GmbH, Ammerbuch (DE)

(72) Inventor: Albin Maisch, Ammerbuch (DE)

(73) Assignee: Dr. Albin Maisch High Performance LC GmbH, Ammerbuch (DE)

( * ) Notice: Subject to any disclaimer, the term of this patent is extended or adjusted under 35 U.S.C. 154(b) by 211 days.

(21) Appl. No.: 16/378,899

(22) Filed: Apr. 9, 2019

(65) Prior Publication Data

US 2019/0310233 A1    Oct. 10, 2019

(30) Foreign Application Priority Data

Apr. 9, 2018    (DE) .................... 20 2018 001 788.4

(51) Int. Cl.
| | |
|---|---|
| *G01N 30/22* | (2006.01) |
| *B01D 15/20* | (2006.01) |
| *B01D 15/22* | (2006.01) |
| *G01N 30/56* | (2006.01) |
| *G01N 30/60* | (2006.01) |

(52) U.S. Cl.
CPC .......... *G01N 30/22* (2013.01); *B01D 15/206* (2013.01); *B01D 15/22* (2013.01); *G01N 30/56* (2013.01); *G01N 30/60* (2013.01); *G01N 30/6004* (2013.01); *G01N 2030/562* (2013.01)

(58) Field of Classification Search
CPC .... G01N 30/22; G01N 30/6004; G01N 30/56; G01N 30/60; G01N 2030/562; B01D 15/206; B01D 15/22
See application file for complete search history.

(56) References Cited

U.S. PATENT DOCUMENTS

| | | | |
|---|---|---|---|
| 4,361,482 A | 11/1982 | Teetz et al. | |
| 5,951,873 A | 9/1999 | Shalon et al. | |
| 6,444,122 B1 | 9/2002 | Van Davelaar | |
| 7,008,532 B2 | 3/2006 | Shalon et al. | |
| 2010/0163490 A1* | 7/2010 | Lasalle ............... | B01D 15/206 210/656 |

(Continued)

FOREIGN PATENT DOCUMENTS

| | | | | |
|---|---|---|---|---|
| CN | 107061843 A | * | 8/2017 | ............. G01N 30/32 |
| CN | 207169107 U | * | 4/2018 | |

(Continued)

OTHER PUBLICATIONS

English language abstract, and machine-assisted English language translation of German Reference No. DE 10 2016 014 466 extracted from www.espacenet.com on Mar. 22, 2019; 9 pages.

*Primary Examiner* — Waqaas Ali
(74) *Attorney, Agent, or Firm* — Howard & Howard Attorneys PLLC

(57) ABSTRACT

A separating column for use with a filling tube to prepare for chromatography is disclosed. The separating column includes an axially movable spring stamp; and a plurality of springs coupled to the stamp. Moreover, the stamp is depressed directly into the column tube during column packing via the filling tube. Additionally, the stamp is fixed in the column tube while maintaining the packing pressure so that the springs are compressed during the packing process and press the stamp permanently and dynamically onto a chromatographic bed.

6 Claims, 4 Drawing Sheets

(56) References Cited

U.S. PATENT DOCUMENTS

| | | | |
|---|---|---|---|
| 2012/0085462 A1 | 4/2012 | Maier-Rosenkranz et al. | |
| 2013/0199999 A1* | 8/2013 | McChesney | G01N 30/34 |
| | | | 210/656 |
| 2013/0228501 A1 | 9/2013 | Lefebvre et al. | |
| 2018/0078877 A1 | 3/2018 | Rahn et al. | |

FOREIGN PATENT DOCUMENTS

| | | | |
|---|---|---|---|
| DE | 30 38 132 A1 | 5/1982 | |
| DE | 202016000500 U1 * | 3/2016 | G01N 30/56 |
| DE | 10 2016 014 466 B4 | 2/2018 | |

\* cited by examiner

LC-COLUMN WITH DYNAMIC-AXIAL COMPRESSION (DAC)

CROSS-REFERENCE TO RELATED APPLICATION

This is a U.S. National application under 35 U.S.C. § 111(a) claiming priority to German Utility Model No. DE 20 2018 001 788.4, filed Apr. 9, 2018, the entire contents of which are hereby incorporated by reference.

TECHNICAL FIELD

In liquid chromatography (liquid chromatography, LC, high-pressure liquid chromatography, HPLC) columns made of steel, glass or plastic, packed with special powders are used.

BACKGROUND

A standard LC column consists of a stable tube which contains the powdery packing and is closed at both ends with a cover having an opening, a porous frit and a seal. In larger columns a flow distributor can also be incorporated.

LC columns are used to analyze and purify chemical, pharmaceutical substances: in principle all substances which are soluble in water can be analyzed.

In preparative LC an attempt is made to purify fairly large quantities of raw substances in order to use these subsequently, for example, as medicinal products. The raw extracts are injected into the column, then pressed through the column with liquid eluents and thereby separated into individual components. In order to achieve good results, the packing inside the columns must always be firm and uniform and in particular must not slump down and form cavities (dead volumes) which would cause the separation to deteriorate.

For filling, the LC columns are usually connected to a so-called slurry filling tube. A particle-liquid mixture is emptied into this combined filling tube column combination in order to then depress this into the actual LC column with the aid of a packing apparatus at high pressures (up to several thousand bar). Since the liquid can escape via an outlet but the particles cannot, the particles accumulate in the actual LC column and form the so-called column packing, also called chromatographic bed or stationary phase.

After the end of the packing process, the LC column is removed from the filling tube part again and finally closed.

This removal of the columns from the actual filling tube is a very critical and crucial process in the production of preparative LC columns:

The filling material pressed into the column tube can relax to a greater or lesser extent again during separation from the filling tube depending on its elastic properties and can migrate a few millimetres out from the column inlet.

In this case, the ideal packing structure disintegrates again and material can even be lost. The packing material which has swollen out by a few millimetres can no longer be pressed back when closing. This material must be removed before closing and discarded in order to obtain a tightly sealed column.

However this has two very negative consequences:

Both the separating performance and also the lifetime of the column deteriorate since so-called dead volumes (cavities) can form subsequently during working when the filling material slumps down again and migrates back.

In order to keep this negative effect as small as possible in conventional standard packing technology, it is always necessary to work very rapidly in this column removal process. Nevertheless however, this negative effect of swelling out can never be completely avoided in these standard columns.

If it is desired to produce optimal columns, this swelling out from the column must be completely prevented. The packing must remain permanently compressed. The packing material must be prevented from relaxing again and expanding. The column stamp which compresses the particle packing must be fixed in place even under pressure. The stamp must not migrate back in any case. The push bar which pushes the stamp into the column may only be retracted in order to be able to take the column from the packing stand after fixing the stamp in the actual LC column tube.

In order to achieve this, two different methods exist on the market: the SAC and the DAC method:

In the SAC method the stamp is immediately fixed firmly and immovably in the column tube after the packing process even before the packing pressure is taken from the system. We then talk of static axial compression (SAC method).

In the DAC method the stamp is fixed with the aid of compressed springs or with the aid of a hydraulic permanently pressing pump. We then talk of dynamic axial compression (DAC method).

In the spring stamp technique elastic springs are automatically compressed by the push bar of the packing apparatus which presses onto the springs from behind during packing and these elastic springs then press the column stamp permanently, dynamically axially from the front onto the packing as a result of their suspension mechanism.

SUMMARY

In the DAC column newly described here, the spring stamp can be depressed into the column and held in a fixed position with suitably long spacer elements (FIGS. 1 and 2).

It is also new in the invention described here that slurry filling tube and DAC column are two separate parts which must only be combined for the packing: after the packing process DAC column and slurry filling tube can be separated again. The filling tube does not remain part of the DAC column with the result that the finished columns are no longer so cumbersome.

The newly developed removable DAC columns are significantly lighter and in particular shorter. Usually these removable DAC columns are only half as long as in the predecessor model (U.S. Pat. No. 7,008,532).

This is particularly important if the columns must be thermostatically controlled subsequently for difficult separations in a column furnace. Usually only columns having a maximum length of about 40 cm fit in conventional column furnaces. The excessively long predecessor patent version usually does not fit in these column furnaces, which is a major disadvantage.

The types of column newly described here no longer have this disadvantage. They are suitable for column furnaces and in addition, are more material-saving, cheaper and more convenient.

In contrast to the hydraulic DAC columns on the market, the DAC columns newly described here have the following advantages:

1.) the columns can be removed from the packing stand
2.) the columns are more convenient and economical and
3.) they fit into commercial column furnaces.

In contrast to the SAC method, in the DAC method the springs compressed during the packing process continue to press the column stamp dynamically onto the packing and as soon as the column bed slumps back, push the stamp behind the packing. If the resistance of the column bed decreases, the springs relax axially in the direction of the column bed until they impact against the resistance of the column bed again. The stamp migrates dynamically behind the packing so that both are always in contact. A cavity is prevented from forming between stamp and column bed, which would cause the column quality to deteriorate.

Unlike the SAC patent DE 10 2016 014 466.1 of Dr. Maisch GmbH, in this DAC invention elastic elements in the form of springs (mostly disk or helical springs) are used in order to build up a permanent dynamic pressure on the chromatographic bed with the aid of their rebound force and to push the stamp automatically behind the bed in the event of any loss of volume. SAC columns on the other hand can no longer change the position of the stamp after its fixing. The stamp always remains at the same place and only maintains the packing pressure but it cannot migrate behind a shrinking packing.

A common problem in SAC and DAC methods is that the quantity of packing material that must be used for packing a column having a specific length must be known precisely beforehand.

If too little packing material is taken, the column bed is too short and the column stamp migrates deeply into the column tube.

There then remains a large intermediate space between column inlet and the low lying spring stamp. However, as a result of the extended push rod which stands in the way as it were, this gap cannot be simply filled subsequently with further annular springs. Annular, i.e. closed elements, can no longer be inserted on account of the push rod.

However, open half-shell spacers offer one possibility: these can be inserted subsequently around the push rod and stamp upper part in order to fix the stamp which is located deeper than is desired.

In this case, the column need not necessarily be emptied again on account of the material weight actually being too low because the column can no longer be closed for technical reasons. Despite this the column can be closed with suitably long half-shell spacers.

The separating results of this shortened column can be subsequently corrected mathematically if necessary.

Subsequently the invention is explained by means of four drawings.

BRIEF DESCRIPTION OF THE DRAWINGS

The drawings show.

DETAILED DESCRIPTION

An LC column generally consists of the column tube which contains the actual chromatographic packing (column bed), the column inlet and the column outlet:

The column inlet of this new invention consists of the following parts: a column stamp (f) with frit (g) and seals (h), the springs (m), the spring retaining rings (r), a flange pull ring (d), the two column cover halves (b) and the flange screws (c).

Figure 4:
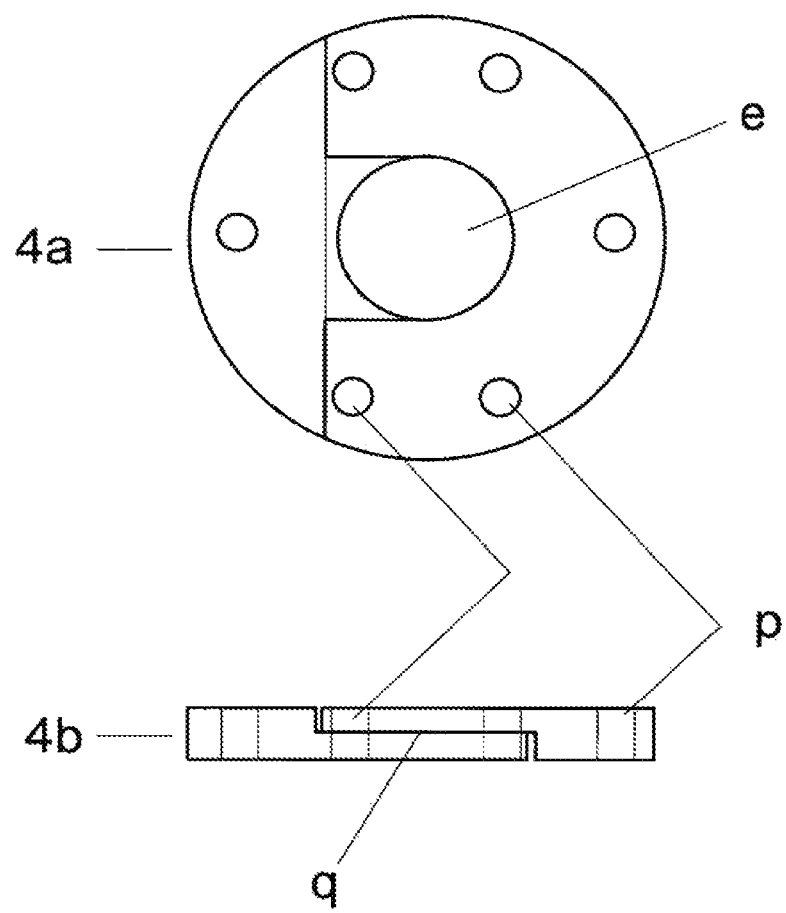
FIG. 4: column cover halves with inner opening

The column cover halves are shown in FIG. 4 in plan view (4a) and in cross-section (4b). The half-shells are shown in FIG. 2(i) in plan view and in longitudinal section.

Located between the two column cover halves (b) and the column stamp (f) are the springs, delimited at the top and bottom by a spring retaining ring (r). In addition, variously many half-shells (i) can be used for bridging between column cover halves (b) and upper spring retaining ring.

The column cover halves contain an inner opening (e) for the push rod of the packing apparatus (s) which presses the column stamp out from the filling tube (t) into the actual column (j).

Operating Mode of an LC Column

In working use a liquid eluent is guided via the inlet capillary (a) into the column tube with column packing (k). The eluent leaves the column again via the outlet capillary (l).

Figure 1:
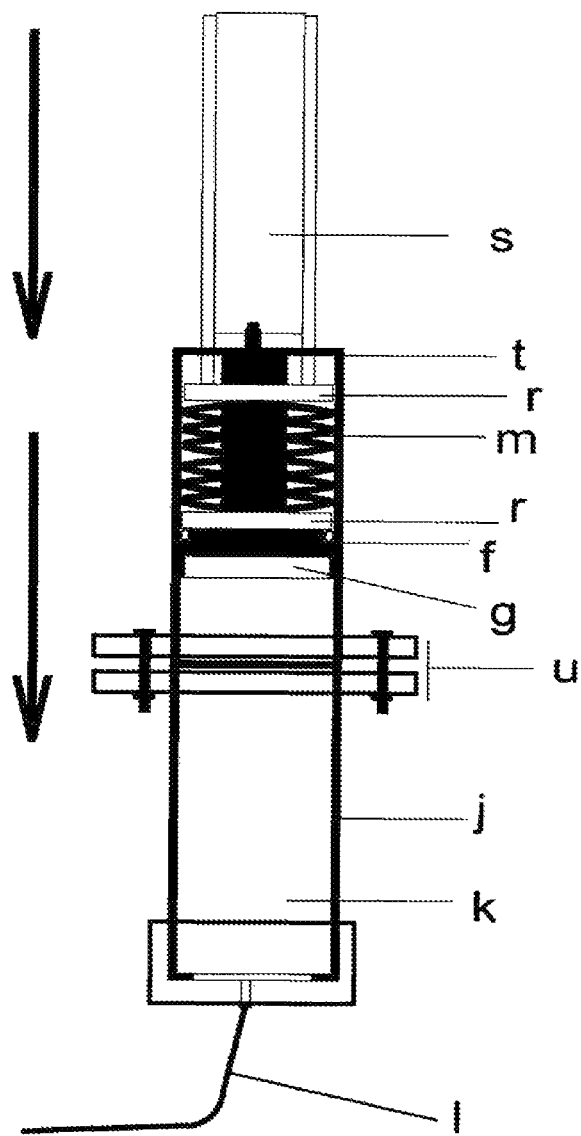
FIG. 1: filling apparatus with assembled DAC column and filling tube

Packing Process of a DAC Column (FIG. 1)

By means of the push bar (s) of a high-pressure packing pump the column stamp (f) backed with springs (m) is pressed out from the filling tube (t) into the column tube (j), where it is finally fixed.

For fixing the column stamp still under high pressure must be stopped, i.e. before the push bar retracts by placing two half-shells (FIG. 1, i) around the tapered upper part of the stamp above the upper spring retaining ring (r) and then fixing these with the two column cover halves (b) and screws (c) on a flange pull ring (d) which is fastened to the outside of the column tube.

During the high-pressure packing process the springs are compressed so that they subsequently press permanently dynamically onto the column bed with the stored relaxation force. The springs must be constructed so that they can be compressed by the high packing pressure during the column packing but not by the lower working pressure during the subsequent separations.

With the construction and procedure presented here, it is ensured that the stamp can no longer be pressed back by the packing (k) under tension. The pressure originally applied by the push bar is absorbed by the column cover halves, the half shells, the compressed springs, the two spring retaining rings, the flange pull ring and the flange cover screws.

The chromatographic packing (k) thus remains under permanent dynamic axial compression and cannot expand and relax again.

The subsequent retraction of the push rod is necessary to be able to remove the column from the packing stand. This is not possible with the hydraulic dynamic DAC columns without compression springs. Here the hydraulic apparatus must press permanently and dynamically onto the column packing for which the columns must remain in the packing state.

REFERENCE LIST

Figure 2:
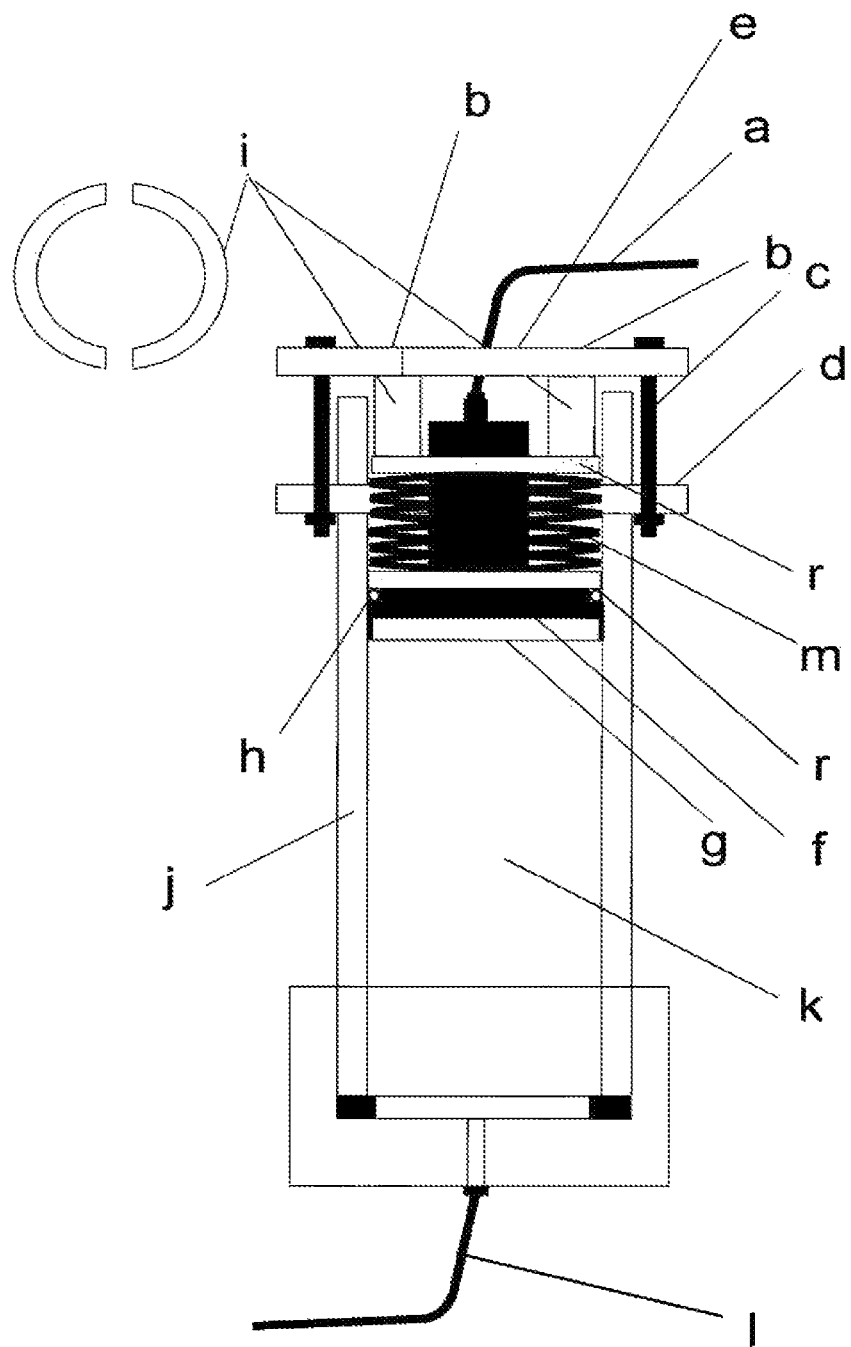
FIG. 2: ready packed DAC column with steel springs
Figure 3A:
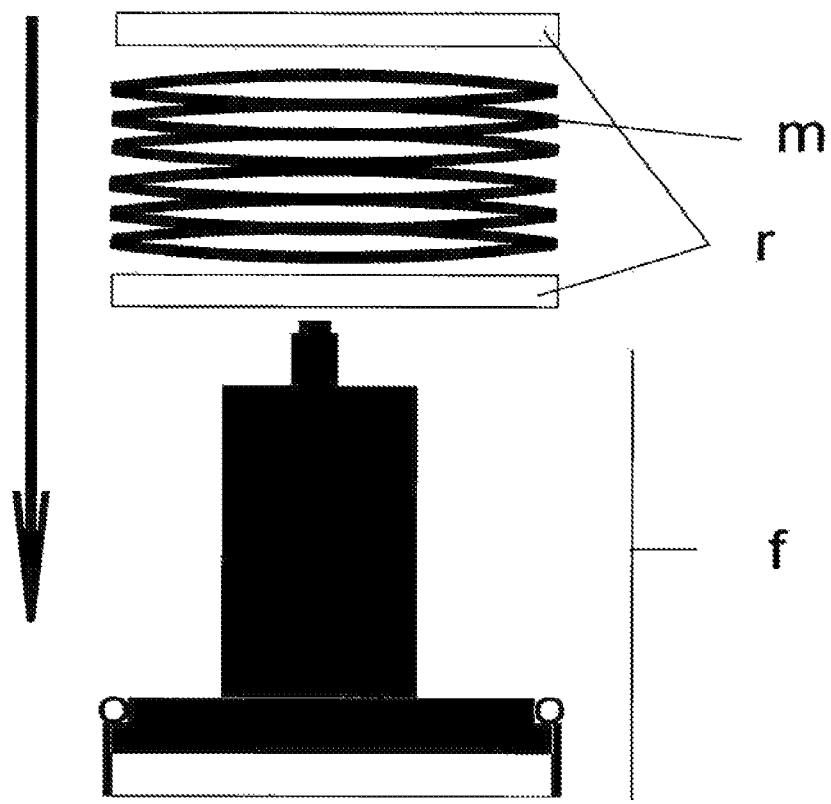
FIG. 3: DAC column stamp before (FIG. 3a) and after (FIG. 3b) assembly with steel springs and spring retaining rings
Figure 3B:
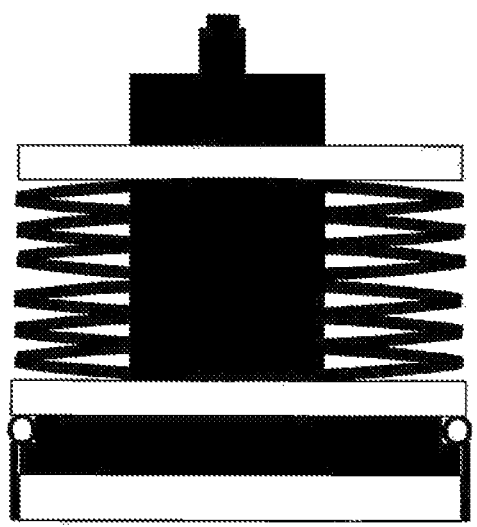

FIG. 1: column packing state for the packing of DAC columns with filling tube
s=Push bar
t=Filling tube
j=Column tube f=Column stamp
u=Coupling point of filling tube and column tube
l=Column outlet
k=Column packing
g=Stamp frit
m=Springs
FIG. 2: DAC column with spring compression technique and two built-in half shells
a=Inlet capillary
b=Column cover halves with inner opening
c=Flange cover screws (not all indicated)
d=Flange pull ring
e=Column cover opening for hydraulic push bar (not visible)
f=Stamp
g=Stamp frit
h=Stamp seal
i=Support elements (half shells)
j=Column tube
k=Column packing
l=Column outlet
m=Springs
FIG. 3: Spring stamp construction: before (3a) and after (3b) assembly
r=Spring retaining rings
m=Steel springs
f=Stamp
FIG. 4: column cover halves
3a: Plan view
p=Screw holes
e=Opening in column cover halves for push bar
3b: Side view of column cover halves
p=Screw holes
q=Overlap position of column cover halves

The invention claimed is:

1. A separating column for use with a filling tube to prepare for chromatography, the separating column comprising:
an axially movable stamp; and a plurality of springs coupled to the stamp,
the stamp being depressed directly into the separating column during column packing via the filling tube; and
the stamp being fixed in the separating column while maintaining a packing pressure so that the plurality of springs are compressed during a packing process and press the stamp permanently and dynamically onto a chromatographic bed,
wherein the stamp is fixed in any end position inside the separating column by a plurality of spacers in the form of half-shells.

2. The separating column according to claim 1, wherein the plurality of springs are comprised of stainless steel.

3. The separating column according to claim 1, wherein the separating column is configured to be removable from the filling tube after the packing process.

4. A liquid chromatography column for use with a filling tube containing a particle-liquid mixture and a packing apparatus pressing the particle-liquid mixture from the filling tube into the liquid chromatography column, the liquid chromatography column comprising:
a column tube for containing a chromatographic packing material formed from the particle-liquid mixture; and
a column inlet coupled to the column tube, the column inlet comprising:
a plurality of covers coupled to the column tube;
a stamp axially movable relative to the plurality of covers, with the stamp being pushed by the packing apparatus onto the chromatographic packing;
a plurality of spacers positioned between the stamp and the plurality of covers to hold the stamp at any end position—in the column tube to compress the chromatographic packing material when the packing apparatus is retracted from the column tube; and
a plurality of springs adapted to press the stamp onto the chromatographical packing material when the chromatographical packing material shrinks,
wherein the plurality of spacers comprise a pair of open half shells inserted around the packing apparatus.

5. The liquid chromatography column according to claim 4, wherein the plurality of covers comprise a pair of open cover halves inserted around the packing apparatus to form an inner opening with the packing apparatus disposed in the inner opening.

6. The liquid chromatography column according to claim 4, further comprising a first retaining ring positioned between the stamp and the plurality of springs, and a second retaining ring positioned between the plurality of spacers and the plurality of springs.

* * * * *

UNITED STATES PATENT AND TRADEMARK OFFICE
CERTIFICATE OF CORRECTION

PATENT NO. : 11,280,770 B2
APPLICATION NO. : 16/378899
DATED : March 22, 2022
INVENTOR(S) : Albin Maisch It is certified that error appears in the above-identified patent and that said Letters Patent is hereby corrected as shown below:

In the Claims

Column 6, Line 27 (Claim 4): delete "position-in" and insert therefor -- position in --

Signed and Sealed this
Fifth Day of July, 2022

Katherine Kelly Vidal
*Director of the United States Patent and Trademark Office*